I. E. PALMER.
COMPENSATING AXLE AND SUPPORTING STANDARD.
No. 184,421. Patented Nov. 14, 1876.
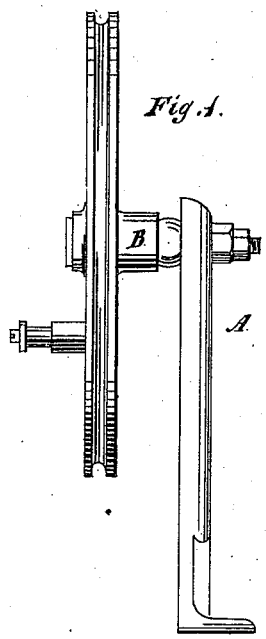
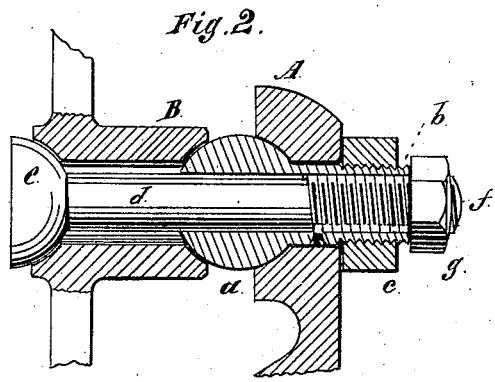
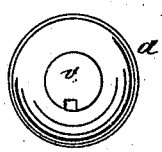

UNITED STATES PATENT OFFICE.

ISAIAH E. PALMER, OF TOULON, ASSIGNOR TO HARRY C. GOODRICH, OF CHICAGO, ILLINOIS.

IMPROVEMENT IN COMPENSATING-AXLE AND SUPPORTING-STANDARD.

Specification forming part of Letters Patent No. 184,421, dated November 14, 1876; application filed July 7, 1876.

*To all whom it may concern:*

Be it known that I, ISAIAH E. PALMER, of Toulon, Stark county, State of Illinois, have invented a new and useful Improvement in Compensating-Axles, of which the following is a full description, reference being had to the accompanying drawings, in which—

Figure 1 is an elevation; Fig. 2, a vertical longitudinal section; Fig. 3, a detail.

This invention relates to compensating-axles, and has for its object to set or adjust the wheel and the bearing, as will be hereinafter more fully set forth.

In the drawings, A represents a standard, in which one end of the axle is supported. $a$ is a globular piece of metal, having a stem, $b$, which passes through a hole in the standard A, which standard is cut out upon the inside in a circular or concave form to receive a portion of the globe $a$. The stem $b$ is provided with a screw-thread, and is secured firmly in place by means of the nut $c$. Through $a$ is a hole, $v$, to receive a spindle. $d$ is a spindle, having upon one end a head, $e$, circular or convex in form, as shown in Fig. 2. This spindle passes through the hole $v$ in $a$, and is provided upon the end $f$ with a screw-thread. B is the hub of the wheel. The main opening through this hub is somewhat larger than the spindle $d$, but at each end is circular or concave in form, and adapted to receive a part of the bearings $a$ $e$. $g$ is a nut upon the end of the spindle $d$.

In use, $a$ is first secured in place by inserting its stem $b$ through the standard A and tightening the nut $c$. The spindle $d$ is then passed through the hub B, and through the head $a$ and stem $b$, and is held in place by the nut $g$, by means of which the space between $a$ and $e$ can be adjusted at pleasure; and as the inside of the globe fits in the concave part of the standard, and the globe is provided with the sleeve independent of the shaft, the wheel can be set to run true, even if the perforation through the standard is not exactly straight.

It will be seen that the hub B revolves upon the bearings $a$ $e$, and does not touch the spindle $d$. These bearings $a$ $e$ being circular in form, and the interior of the hub, which comes in contact with these bearings, being correspondingly concave, there can be no difficulty in fitting the parts.

The spindle is prevented from turning in the head $a$ by means of a feather. If the hub becomes loose upon the bearings, from wear or other cause, the difficulty can be remedied by simply turning the nut $g$.

I am aware that a compensating-axle having conical bearing-surfaces for the hub has been used; but the construction of the parts is quite different from that which I have shown.

It is frequently necessary to ream out, by hand, the hubs designed to be used with the said conical bearings, which is done with a conical reamer; and it is almost impossible to hold the reamer true and do the work accurately, and so that the hub will fit the bearings. With my circular or convex bearings $a$ $e$, and concave surfaces within the hub, the difficulty is wholly avoided, because, if a globular reamer is used, the parts must fit.

What I claim as new, and desire to secure by Letters Patent, is as follows:

The standard A, having concavity on the inside, around the perforation, to receive the stem, in combination with the globe $a$, provided with the stem $b$, spindle $d$, and the convex bearings, substantially as and for the purpose set forth.

ISAIAH E. PALMER.

Witnesses:
JAMES H. MILLER,
J. N. GRAFTON.